United States Patent [19]

Snyder et al.

[11] 3,833,428

[45] Sept. 3, 1974

[54] DIRECT HEAT REJECTION PATH RADIOISOTOPIC THERMOELECTRIC GENERATOR

[75] Inventors: Donald L. Snyder, Fork; John H. Himes, Jappa; Milton F. Pravda, Baltimore, all of Md.

[73] Assignee: Isotopes, Incorporated, Westwood, N.J.

[22] Filed: Sept. 25, 1969

[21] Appl. No.: 860,884

[52] U.S. Cl. .................. 136/202, 136/208, 136/212

[51] Int. Cl. .......................................... G21h 1/10

[58] Field of Search ........... 136/202, 211, 212, 205, 136/230, 208, 201

[56] References Cited

UNITED STATES PATENTS

| | | | |
|---|---|---|---|
| 3,075,030 | 1/1963 | Elm et al. | 136/202 |
| 3,082,275 | 3/1963 | Taloat | 136/208 |
| 3,226,804 | 1/1966 | Hasenclever | 136/201 X |
| 3,231,965 | 2/1966 | Roes | 136/201 X |
| 3,234,048 | 2/1966 | Nelson | 136/202 X |
| 3,269,872 | 8/1966 | Thompson | 136/208 |
| 3,332,807 | 7/1967 | Boehmer et al. | 136/230 X |
| 3,379,577 | 4/1968 | Bird, Jr. | 136/201 X |
| 3,457,121 | 7/1969 | Tomlinson | 136/208 |

*Primary Examiner*—Harvey E. Behrend
*Attorney, Agent, or Firm*—Fleit, Gipple & Jacobson

[57] ABSTRACT

Compression springs on the hot side, bias the thermoelectric elements of the radioisotopic powered thermo-electric generator into contact with the casing wall. The bus straps, which electrically connect the cold ends of the thermoelectric elements are bonded directly to the inner wall of the casing by a pressure sensitive epoxy adhesive which is preferably a dielectric but a good thermal conductor thereby eliminating the need for cold-end hardware.

6 Claims, 4 Drawing Figures

INVENTORS.
DONALD L. SNYDER
JOHN H. HIMES
MILTON F. PRAVDA

BY Sughrue, Rothwell, Mion, Zinn & Macpeak
ATTORNEYS.

INVENTORS.
DONALD L. SNYDER
JOHN H. HIMES
MILTON I. PRAVDA

BY Sughrue, Rothwell, Mion, Zinn & Macpeak
ATTORNEYS.

DIRECT HEAT REJECTION PATH RADIOISOTOPIC THERMOELECTRIC GENERATOR

BACKGROUND OF THE INVENTION

1. Field of the Invention

This invention relates to thermo-electric generators, and more particularly to such generators powered by a radio-isotopic heat source in capsule form which is carried centrally of the generator assembly.

2. Description of the Prior Art

Radioisotopic fueled thermoelectric generators have been developed in recent years for terrestrial applications where surface support is practically impossible, such generators being generally of the small wattage type. The known designs have employed centrally located, shielded radioisotopic fuel capsules surrounded by suitable thermal and radioactive shielding material. The thermal energy released by isotopic decay, is directed, either radially or axially, to static thermoelectric converter means which surrounds the same and which may be exterior or interior of all or a portion of the radioactive shielding material.

Most known thermo-electric generator assemblies, utilizing a static heat rejection system, operate with a design goal to funnel as much of the available heat as possible through the individual thermo-electric element. Ideally, one would design a generator with a spherical heat source surrounded by a solid layer of thermo-electric materials. Such a design is impractical due to fabrication, assembly and fueling problems so that most generators to date employ the configuration of a right circular cylinder with the thermoelectric elements covering the center section of the cylinder in one form wherein the two ends are utilized for electrical penetrations and fueling access ports, or alternatively, surround the cylindrical fuel source with thermal insulation and employ planar modules which carry the thermo-electric element at opposed ends of the cylinder. In either case, the fuel container or capsule is itself surrounded by heat accumulator blocks (heat shield) whose purpose it is to provide the fueling cavity, distribute the heat equally to the elements, and to provide a surface for the hot side of the thermoelectric element (hot shoe) to contact for good thermal conduction. The element, which also must be optimized in configuration (diameter and length) to provide the mission power and voltage requirements, are positioned in contact with the heat accumulator block in a manner best utilizing the space consistent with a good modular approach. Void areas between elements are filled with thermal insulation. To facilitate assembly of the unit, to keep the element hot shoes in good contact with the heat accumulator block, to compensate for slight variations in element height, and to take up differential thermal expensions between components, the elements are spring loaded from the cold side.

One type of arrangement for spring loading the elements from the cold side is shown and described in U.S. application Ser. No. 474,547, now U.S. Pat. No. 3,615,869, filed July 26, 1965 to Theodore R. Barker et al., entitled "Low Cost Radioisotope Thermoelectric Generator" and assigned to the common assignee. The spring loading is accomplished through an alignment button and piston which have matched spherical seats. The alignment button is free to slide on the element's cold side connecting strap and its spherical surface allows mating with the spring piston even if the piston and element have a slight radial or longitudinal misalignment. The pistons house the compression springs and are free to ride in holes provided in a heat sink bar. The heat transfer path from the heat source to the radiating surface is through this series of components (alignment button, piston and heat sink bar), necessitating extremely close tolerance fits and finely machined mating surfaces. In addition, since the alignment button is in direct contact with the element's electrical connecting strap, a dielectric material must be used between the connecting strap and the heat sink bar.

To constitute a competitive power supply source for future space missions, generators of this type must show an increase in specific power and efficiency with a reduction in weight and cost. Not only are generators of the type shown in the referred-to application characterized by low specific power, requiring extremely close tolerances, and expensive hard coating (forming an electrical insulation surface), but the cold end components such as pistons, buttons, and the heat sink bar cause relatively large heat losses from the cold end of the thermoelectric element to the radiating surface and produce an assembly which is both massive in size and expensive to manufacture.

SUMMARY OF THE INVENTION

This invention is directed to an improved radioisotopic thermo-electric generator of increased specific power, and of reduced cost. The generator assembly of the present invention eliminates the use of pistons, buttons and heat sink bars on the cold side of the thermoelectric conversion means by providing compression springs between the radioisotopic fuel capsule and the thermoelectric element for biasing the same directly against the generator casing. In this respect, the copper straps electrically coupling the cold ends of thermoelectric element are bonded to the inner wall of the generator casing by an adhesive which is inherently dielectric but thermally conductive.

In one form, the centrally located, shielded, cylindrical, radio-isotopic fuel capsule is surrounded by a plurality of sector shaped members in circumferential abutting fashion with their end walls lying in parallel radial planes, with the coil springs positioned between respective sector end walls. Each sector shaped member carries a flat outer surface and a plurality of thermoelectric elements are radially positioned on the flat surface of the sector shaped members and between the members and a concentric outer casing. Compression springs bias the sector shaped members apart while forcing the thermoelectric elements radially into contact with the outer casing. Preferably, the opposing end walls of the sector shaped member each carry recesses for receiving respective ends of the springs. The copper straps electrically coupling the cold ends of the thermoelectric element are adhesively bonded to the inner wall of the generator casing by an epoxy adhesive material. The sector shaped members may be pressure sensitive with their flat surfaces forming a hexagon and the outer casing is formed of metal sheet stock of similar configuration. The casing and blocks may have any polygonal cross sectional configuration. During assembly, the thermoelectric elements are inserted within the casing or housing, which is preliminarily coated with a suitable adhesive, and cured. Just prior to such assembly, the module inside of the housing is again coated with an adhesive, the elements are installed and the final bond allowed to cure.

Where the generator assembly comprises a thermoelectric conversion module overlying the open end of the casing for axially receiving released thermal energy the disc-like heat rejection plate has a copper strap coupling adjacent thermoelectric elements bonded to its surface by a suitable adhesive. A plurality of Rene 41 or other suitable spring material leaf springs overlie respective thermoelectric elements and are sandwiched between the module cover plate on the hot side of the assembly and the heat source axial shield plug for biasing the cover the thermoelectric elements towards the heat rejection plate.

DESCRIPTION OF THE PREFERRED EMBODIMENTS

Figure 1:
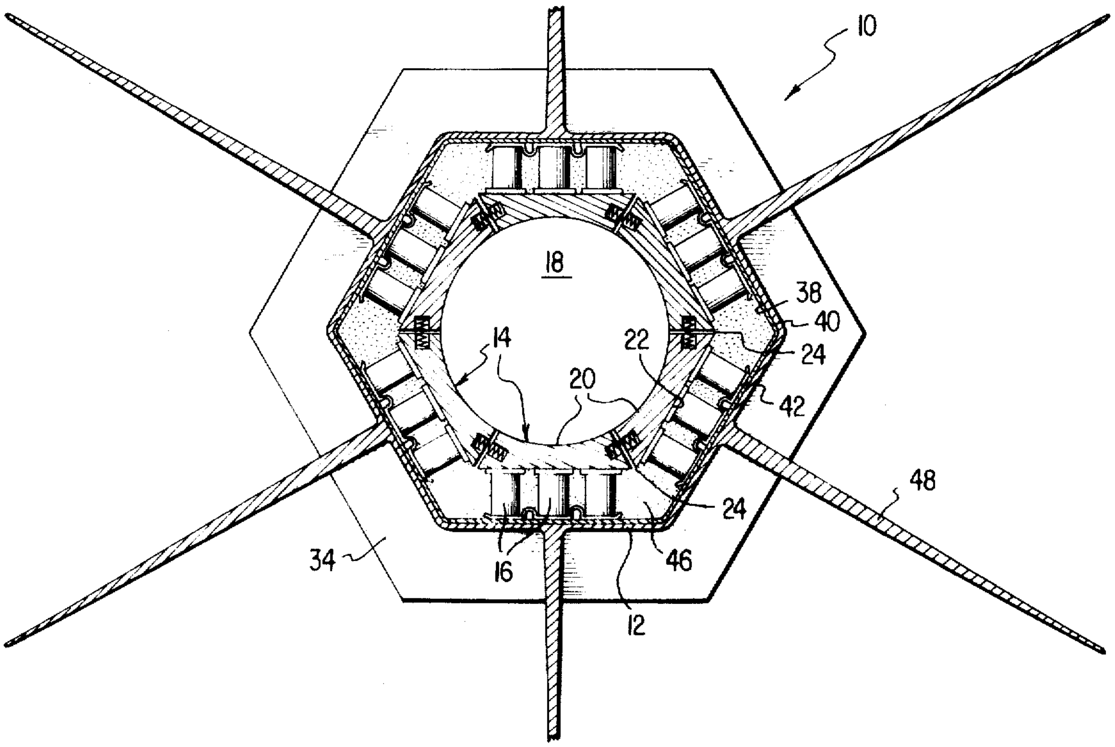
FIG. 1 is a sectional end elevation of one embodiment of the radioisotopic fueled thermoelectric generator of the present invention with the fuel capsule removed.
Figure 2:
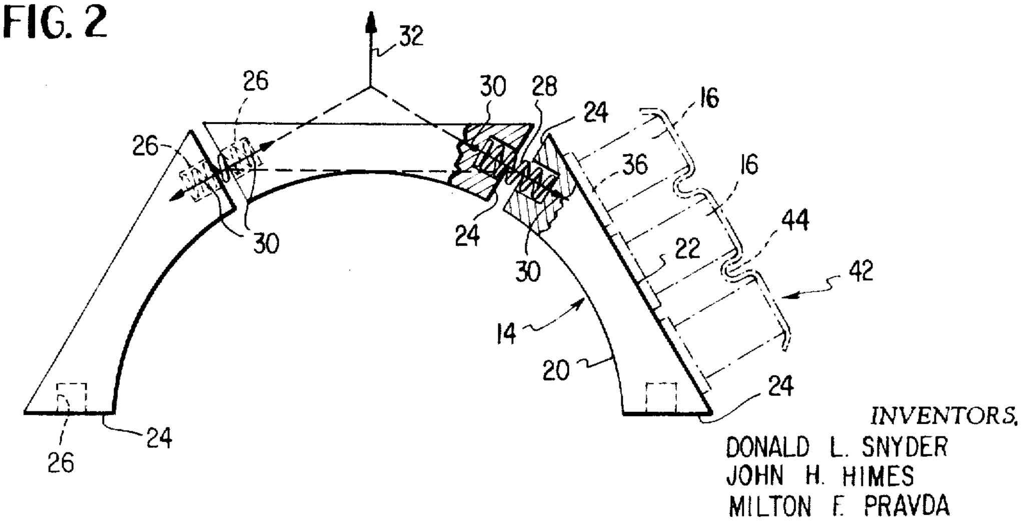
FIG. 2 is a schematic diagram of a portion of the assembly of FIG. 1 showing the arrangement of the compression springs for biasing the thermoelectric element from the hot side thereof.

Referring to FIGS. 1 and 2 of the drawing, the radioisotopic powered thermoelectric generator assembly of the present invention is indicated generally at 10, is polygonal in cross-sectional configuration and includes as primary components, an outer casing or housing 12, a plurality of sector shaped graphite members or heat accumulator blocks 14 and thermoelectric converter means in the form of thermoelectric elements 16 positioned between the blocks 14 and casing 12. A cavity 18 which is cylindrical in configuration, is centrally located for receiving a shielded or unshielded radioisotopic fuel capsule of conventional form and configuration (not shown). Such fuel sources are well known and may constitute strontium 90, plutonium 238, curium 144, or other known radioisotopic fuels.

Graphite blocks 14 constitute sector shaped members or segments with the segments being provided with a curved inner surface 20, a flat outer surface 22, and end surfaces 24. The opposed end surfaces 24 for respective adjacent blocks 14 lie along spaced radial planes. Within these radially cut end faces, are appropriate cavities or holes 26 with opposed holes or cavities accepting respective ends of small compression springs 28. The springs need not be oriented in this position rather they could be located such that force component is parallel to the couple assemblies.

These springs 28 and their orientation provides the unique means of loading the individual thermoelectric element 16, since a component of the spring forces on each face produce a radial compression load on the thermoelectric elements. This is seen in greater detail with reference to FIG. 2. As indicated in FIG. 2, the compression spring 28, while restrained by the recesses or holes 26, tends to force the individual graphite blocks or members 14 apart, that is, away from each other as indicated by arrows 30 creating a force component 32 in a radial direction tending to force the flat outer surface 22 of the block radially outward and in the direction of casing 12.

While the schematic illustrating of FIG. 2 shows a relatively large gap between the end faces of the individual segments 14, the depth of the spring hole 26 and the cavity 18 would be sized such that at assembly, there would be a minimal gap between segments at the desired load so as to reduce heat transfer loss.

Referring to FIG. 1, it is noted that the overall design of the assembly is highly simplified in contrast to that of the referred-to application. Housing or casing 12 constitutes a polygonal magnesium or aluminum alloy sheet. The end flanges to which the covers 34 bolt compressing the seals may be either polygonal (as shown) or round and are welded in place subsequent to blocks 14 carrying the thermoelectric element 16 being inserted within the open end casing 12.

The inside surface 38 is pre-coated with Stycast 2850 GT or other similar pressure sensitive adhesive forming a thin layer 40 (12 to 15 mils) which is allowed to cure. The Stycast forms a layer of material which provides a dielectric insulation and promotes bonding to the core subassembly which is subsequently inserted therein. Just prior to insertion, the inside of the housing is again coated with Stycast 2850 GT adhesive and the thermoelectric elements 16 and the spring biased blocks are inserted within casing 20 and the final bond allowed to cure. It is to be noted that the thermoelectric elements are coupled at their outer or cold end by suitable copper bus bars or straps 42 which carry expansion loops 44 therebetween in conventional fashion. The Stycast 2850 GT bonds the outer surface of the copper bus straps, which themselves are bonded to the cold ends of the thermoelectric element, to the inner surface wall 38 of casing 12. The spring load exerted by compression springs 28 will assure that the entire area will be bonded since the Stycast has enough plasticity to conform to any uneveness tending to form a gap between the copper bus straps 42 and the casing side wall. Curing time is a function of temperature and a temperature should be used which allows a good margin of safety over the copper strap-thermoelectric element cold shoe solder joint temperature. Curing may be achieved at room temperature. It is noted that the individual thermoelectric elements 16 are surrounded by MIN-K insulation 46 which fills the otherwise void area existing between the blocks 14 and the casing 12. The casing carries a plurality of radially extending heat rejecting fins 48 which may be integrally formed with the casing as shown, or welded thereto as desired.

With the design of FIGS. 1 and 2, the employment of the load springs on the "hot" side of the thermoelectric elements 16 not only eliminates the pistons, buttons and heat sink bars of the prior art design, but allows a reduction in size of the housing, flanges, covers and insulation pieces resulting in a weight saving of approximately 33 percent over the existing generator designs. Thermal tests conducted on models using Stycast 2850 GT as a dielectric bond between the copper straps 42 and the housing 12 indicate a reduction of heat loss from the thermoelectric element cold junction to the thin fins of approximately 60 – 70 percent. The cost reduction of the new concept over existing designs is estimated to be approximately 25 percent in machine time only. In addition, considerable time is saved in the assembling of the unit under the steps referred previously.

In an alternate design, a thin washer (not shown) may be bonded to the copper strap with Stycast 2850 GT at each element location. At installation, the load springs would force the disc into contact with the interior surface 38 of the housing 12. No bond would be used at the housing. This material should be a good thermal conductor such as copper or aluminum. Further, the design permits removal of the core or module and block subassembly for module replacement but, of course, would require extra machining operations to assure that all buttons make contact with the housing and there would be an increase in heat loss due to the pressure contact. Alternatively, the disc may be soldered to the copper straps in the same operation that bonds the strap to the element. A thin mica-sheet may then be used between the discs and the housing for dielectric purposes. This would permit core removal and the mica could take up some height variation. In the embodiment shown, the discs are eliminated completely by using specially formed copper straps which are then bonded directly to the housing as shown. Bonding materials other than Stycast 2850 GT or Stycast 2850 FT may be employed such as epoxy polymide, amide, imide, or polybenzimidazole. The cold end adhesive serves both as a bonding agent and as a dielectric material. Primarily, the adhesive, due to its plasticity during the initial forming cycle, compensates for minor height variations from one thermoelectric couple to the other, thereby insuring positive contact with the housing body, thus improving the heat rejection path through the thermoelectric element to the radiating surface. The adhesive also assures dielectric isolation between the copper interconnecting straps and the housing. There exist a number of possible adhesives or cements whose principal properties are high thermal conductivity, good dielectric strength, high temperature limitations, and structural adequacy. Such high temperature adhesives are found in Table 1.

The present invention retains the use of spring loads on the thermoelectric couples to preclude any large increases in generator internal resistance as a result of a catastrophic thermoelectric element to hot shoe bond failure. The springs also provide the desired structural retention of coupling throughout the assembly and during launch operation (for aerospace applications), in addition to compensating for thermal expansion in the thermoelectric elements. The springs, constituting hot side hardware, are located in a region that normally operates at about 900°F. to 1,000°F. Various high temperature alloys are capable of providing the necessary spring loads in this temperature range for long periods of time without serious load relaxation. These are provided in Table II. It is concluded that spring loads in the range of 30 to 60 psi may be provided without exceeding stress levels which would result in appreciable spring relaxation.

TABLE I

HIGH TEMPERATURE ADHESIVES

| Manufacturing Source | Material | Temperature (Continuous)°F | Thermal Condition (Btu-in./ft²/hr/°F) | Volume Resistivity (ohm-cm) | Thermal Expansion (in./in./°F |
|---|---|---|---|---|---|
| E&C | Stycast 2850 GT | 350 | 12.3 | 300°F=$1\times10^{13}$ | $15\times10^{-6}$ |
| E&C | Stycast 2850 FT | 300 | 10.7 | 300°F=$1\times10^{12}$ | $29\times10^{-6}$(°C) |
| E&C | Eccobond 58C | 500 | 200.0 | $2\times10^{-3}$ | $19\times10^{-6}$ |
| E&C | Eccobond 276 | 500 | 9.3 | $10^{-16}$ | $15\times10^{-6}$ |
| E&C | Eccocoat 672 | 500 | 9.3 | $10^{-16}$ | $21\times10^{-6}$ |
| Wakefield | Delta Bond 152 | 500 | 5.0 | 200°F=$1.2\times10^{14}$ | $36\times10^{-6}$(°C) |
| Thermon | T-63 | 1250 | 90.0 | 8.38 | |
| Bloomingdale | FM-34 | 600 | | | |
| Bloomingdale | HT-424 | 500 | | | |
| Epoxylite | 5524 | 600 | | | |
| Epoxylite | 814 | 500 | | 400°F=$10^{9}$ | |
| Topper Manufacturing | Electroceroplast | 3000 | 14.0 | $9\times10^{12}$ | $12\times10^{-6}$(°C) |
| Topper Manufacturing | Ceramabond 503 | 2600 | | | |
| Topper Manufacturing | Ceramacrest 505 | 2900 | 25 | | $1.4\times10^{-7}$ |

Table II

HIGH-TEMPERATURE ALLOY COIL SPRING PROPERTIES

| Alloy | Service Temperature Maximum (°F) | Wire Temper | Heat Treatment Temperature (°F) | Heat Treatment Time (hr) | Stress (psi × 1000) | % Relaxation at 1100°F | % Relaxation at 1200°F | % Relaxation at 1300°F |
|---|---|---|---|---|---|---|---|---|
| Inconel Alloy 718 | 1200 | 15% | 1800 | 1 | 60 | 1.7 | 12.3 | — |
| | | | 1325 | 8* | 50 | — | 9.7 | — |
| Inconel Alloy X-750 | 1300 | Spring | 2100 | 2 | 60 | 12.0 | — | — |
| | | | 1550 | 24 | 40 | — | 4.1 | — |
| | | | 1300 | 20 | 20 | — | — | 8.0 |
| L-605 | 1500 | Annealed | 1500 | 16 | 25 | — | — | 60 |
| | | | 1650 | 16 | 12 | — | — | — |
| S-816 | 1500 | Annealed | 1500 | 16 | 25 | — | — | 54 |
| | | | 1650 | 16 | 6 | — | — | — |
| Rene' 41 | 1500 | Annealed | 1500 | 16 | 25 | — | — | 53 |
| | | | 1650 | 16 | 12 | — | — | — |

*Then furnace cooled to 1150°F and held for 16 hours total.

The design concept illustrated may be used with any type of thermoelectric conversion system without restraint on diameter length, spacing or material doping.

Figure 3:
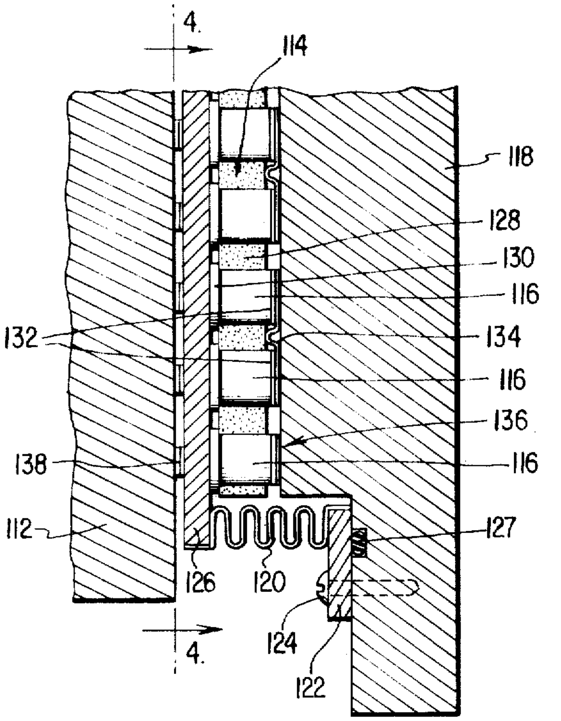
FIG. 3 is a side elevation, in section, of a portion of the thermoelectric generator assembly forming a second embodiment of the present invention.
Figure 4:
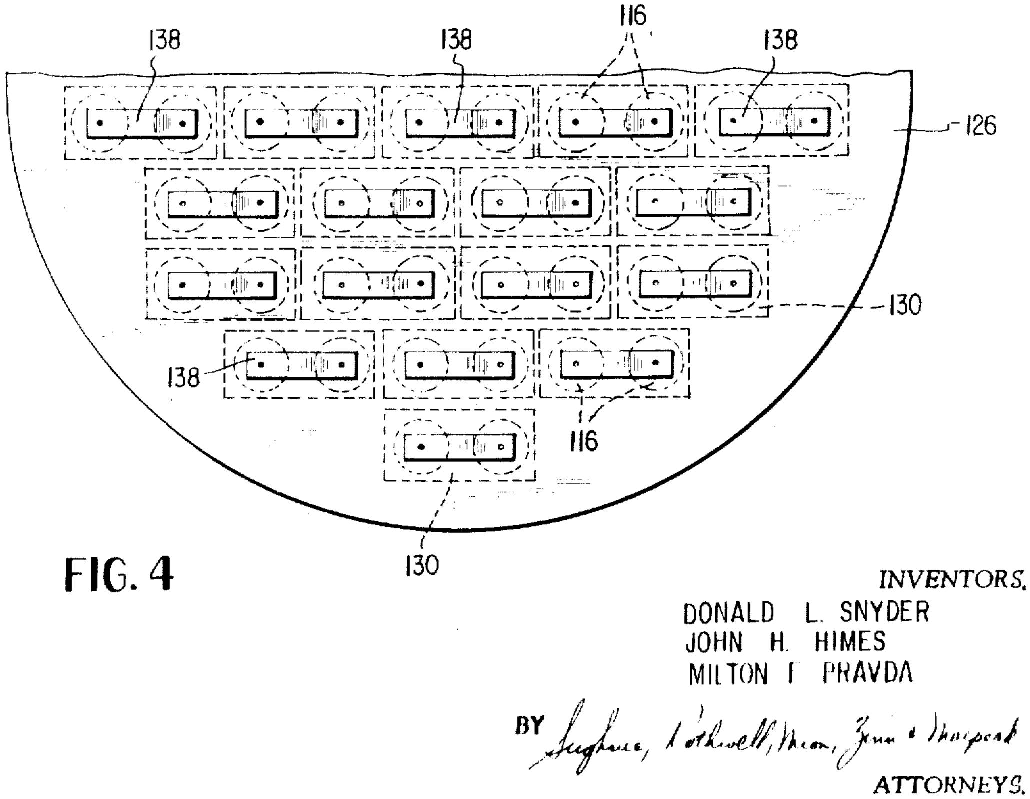
FIG. 4 is a rear elevational view, of a portion of the assembly of FIG. 3 taken about lines 4-4.

Referring next to FIGS. 3 and 4, the concept of employing the compression spring on the hot side of the thermoelectric conversion assembly is readily adaptable to the specific form of generator of the referred-to application. The generator assembly is only partially illustrated but carries a casing (not shown) which is cylindrical in form and a radio-isotopic fuel capsule (not shown) delivers thermal energy axially through a rather thick disc-like shield plug 112 which overlies the otherwise open end of the thermoelectric generator casing (not shown). As thus described, the thermoelectric generator assembly is conventional. Unlike the arrangement in the referred-to application, the thermoelectric conversion module indicated generally at 114, does not include pistons, buttons or sink bars on the cold side of the thermoelectric elements 116 but constitutes a rather thick heat dissipating plate 118 which forms the outer cover for the generator casing (not shown). Module 114 further comprises an annular bellows type side wall 120 which is coupled at one end to plate 118 through an annular mounting ring 122 by means of a series of bolts 124. The ring 122 is sealed to the plate 118 by a conventional O-ring 127. The other end of the bellows type side wall is fixed to the periphery of cover member 126 and forms therewith, a converter cavity 128 receiving a plurality of thermoelectric elements 116. Elements 116 are preferably carried by a perforated disc 128 of thermal insulation of the type sold by Johns Manville under the trade name MIN-K. Thus, the perforated disc 128 of MIN-K insulation supports the thermoelectric elements in preferred orientation with the hot shoe 130 of the same being a rectangular plate slightly wider than the thermoelectric elements 116. The elements 116 carry cold shoes 132 on their outer ends and are suitably connected by copper bus straps 134 to make appropriate electrical circuit connections. As in the previous embodiment, the copper straps 134 may be adhesively coupled or bonded to the surface 136 of the heat sink plate 118, or alternatively, the compressive force exerted by the bellows-like side wall 120 may be sufficient to maintain the elements in a suitable abutting contact for minimum electrical impedance and thermal impedance across the interface between abutting, contacting members.

The present invention in this form also eliminates the necessity for springs, pistons and buttons on the cold side of the assembly and instead employs a plurality of flat leaf springs made from Renee 41 or other suitable metal spring stock. Each spring 138 is rectangular in configuration and of a length sufficient to span a pair of adjacent thermoelectric elements 116. Unlike the prior art, the individual springs 138 are not exerting forces directly on the thermoelectric elements themselves but rather on the cover 126 which in turn exerts compressive force on the thermoelectric element, the springs therefore exert a force in a direction which is parallel to the axis of the individual element.

In addition to exerting compressive force on the assembly which may be bonded or otherwise, the springs maintain compressive force, and even if the couple looses its bond, the element is in compressible contact with the hot and cold shoe without a major reduction in efficiency to transfer heat by thermal conduction or substantial increase in electrical impedance between the same at the contacting interface. While the copper straps are shown in pure abutting contact with the heat sink plate 118, it is preferred in the embodiment of FIGS. 3 and 4, that there is an initial layer or coating of heat conducting dielectric adhesive which is applied to the copper straps and to the housing surface 136 under subsequent assembly and cured. Due to the compression of the bellows side wall 120, all of the hot shoes 132 and the copper straps 134 are in the same plane and everything remains flat regardless of surface irregularities. Of course, due to local thermal expansion characteristics, the individual leaf springs 138 allow some contraction and expansion of the assembly components between plug 112 on the one side and the rather thick heat sink plate 118 on the other side, which expansion and contraction prevents cracking of the thermoelectric material under thermal and mechanical stresses.

From the above, it is noted that the invention resides primarily in the employment of an adhesive for directly forming the cold side (thermal electric element cold shoes or buss straps) directly to the generator casing to eliminate the necessity for cold end hardware such as buttons, pistons, compression springs, cold sink bars and/or corresponding machining, to accept the pistons (in flat concept, plate 118 acts as cold sink bar is machined to accept the pistons). It is conceivable, however, that, even if the adhesive were an electrical conductor, a sheet of mica could be bonded to the housing and the copper strap then bonded to the mica interface. Further, while it is preferable to employ, as the adhesive, a pressure sensitive epoxy, this is merely one group of suitable adhesives.

The cross sectional configuration of the generator is not critical and the concept may be readily applied to a generator of any polygonal shape although preliminary studies of the hexagonal arrangement lends itself to a more efficient generator. Further, the concept is equally valid for a design using a plurality of radioisotope fuel capsules, as to a single capsule, in which case the individual capsule may lie at the planar radial contact surfaces of the individual segments or blocks. Further, while in the instant design the compression spring has been eliminated from the cold end of the assembly and positioned on the hot side, it is envisioned that under proper fabrication and assembly technology, the couple may readily withstand large shock and vibration loads (under areospace applications), and such hot side springs will not be required since the couples may be merely cantilevered from the casing. Further, using high-temperature adhesives and thermal expansion compensating discs as indicated, it would be possible to bond both hot and cold sides of the element (thus eliminating springs completely). If springs are employed, he type of spring is not important and the invention is not limited to compression springs but is equally applicable for leaf springs, Belleville washers or bellows or pressure diaphragms. The fabrication and assembly techniques set forth in the present description are merely exemplary in nature and are not restrained for future designs employing the present invention.

In general, the same advantages of employing the inventive concept for space applications lies equally for terrestrial use, the advantages including reduced cost, reduced assembly time, increased specific power and increased efficiency. Further, the generator may use other than a radioisotopic heat source such as a fossil fuel burner (propane, butane, natural gas, etc. type catalytic burner).

What is claimed is:

1. A thermoelectric generator assembly comprising: a cylindrical radioisotopic fuel capsule, a plurality of sector shaped blocks surrounding said capsule in circumferential abutting fashion with opposed end walls of respective blocks lying in parallel radial planes, each sector shaped block having a flat planar outer surface, a casing concentrically surrounding said sector shaped blocks and spaced radially therefrom, a plurality of thermoelectric elements carried between each sector shaped block and an associated portion of said casing, and spring means interposed between said opposed end walls of respective blocks for biasing said sector shaped blocks apart and for exerting an outward radial force on said thermoelectric elements such that said thermoelectric elements are urged into contact with said casing.

2. The assembly as claimed in claim 1 wherein the opposed end walls of said sector shaped block have recesses and said spring means comprises compression springs with their ends respectively positioned within opposed recesses.

3. The assembly as claimed in claim 1 wherein said thermoelectric elements have their cold ends joined by copper straps with the outer surfaces of said straps being bonded directly to said casing by a dielectric adhesive which is a good thermal conductor.

4. The assembly as claimed in claim 3 wherein said adhesive comprises one compound selected from the group consisting of epoxy, polymide, amide-imide and polybenzimidazole adhesives.

5. The thermoelectric generator assembly as claimed in claim 1 wherein said thermoelectric elements carry copper bus straps electrically connecting the same on the cold sides thereof with the outer surfaces of said copper bus straps bonded directly to said generator casing by a dielectric adhesive which is a good thermal conductor.

6. The thermoelectric generator assembly as claimed in claim 5 wherein said sector shaped blocks have a polygonal exterior configuration when assembled and said casing is formed of thin sheet metal stock bent into like cross-sectional configuration.

* * * * *